United States Patent
Dix

(10) Patent No.: US 7,715,979 B2
(45) Date of Patent: May 11, 2010

(54) NUDGE COMPENSATION FOR CURVED SWATH PATHS

(75) Inventor: Peter J. Dix, Naperville, IL (US)

(73) Assignee: CNH America LLC, New Holland, PA (US)

(*) Notice: Subject to any disclaimer, the term of this patent is extended or adjusted under 35 U.S.C. 154(b) by 333 days.

(21) Appl. No.: 11/553,962

(22) Filed: Oct. 27, 2006

(65) Prior Publication Data

US 2008/0103690 A1 May 1, 2008

(51) Int. Cl.
*G01C 21/00* (2006.01)

(52) U.S. Cl. .................. 701/207; 701/50; 701/202; 701/205; 701/213; 701/214; 342/357.01; 342/357.06; 342/357.11; 340/995.19; 340/588; 340/990

(58) Field of Classification Search .......... 340/588, 340/990, 178; 342/357.01, 357.06, 357.11; 701/41, 42, 207, 213
See application file for complete search history.

(56) References Cited

U.S. PATENT DOCUMENTS

| 5,987,383 | A  | 11/1999 | Keller et al.   |
|-----------|----|---------|-----------------|
| 5,995,902 | A  | 11/1999 | Monson          |
| 6,199,000 | B1 | 3/2001  | Keller et al.   |
| 6,236,924 | B1 | 5/2001  | Motz et al.     |
| 6,377,889 | B1 | 4/2002  | Soest           |
| 6,463,374 | B1 | 10/2002 | Keller et al.   |
| 6,501,422 | B1 | 12/2002 | Nichols         |
| 6,549,849 | B2 | 4/2003  | Lange et al.    |
| 6,553,299 | B1 | 4/2003  | Keller et al.   |
| 6,643,576 | B1 | 11/2003 | O Connor et al. |
| 6,711,501 | B2 | 3/2004  | McClure et al.  |
| 6,865,465 | B2 | 3/2005  | McClure         |
| 6,934,615 | B2 | 8/2005  | Flann et al.    |
| 2004/0186644 | A1 | 9/2004 | McClure et al.  |
| 2005/0197757 | A1 | 9/2005 | Flann et al.    |
| 2005/0197766 | A1 | 9/2005 | Flann et al.    |
| 2006/0178820 | A1 | 8/2006 | Eglington et al.|

*Primary Examiner*—Tuan C To
*Assistant Examiner*—Redhwan Mawari
(74) *Attorney, Agent, or Firm*—Patrick M. Sheldrake; John William Stader; Michael G. Harms

(57) ABSTRACT

A method for adjusting a curved swath path in a swath generation apparatus used in an automated vehicle guidance system to compensate for changes in vehicle position signals.

8 Claims, 10 Drawing Sheets

STRAIGHT LINE PARALLEL GUIDANCE PATTERN

CURVED PARALLEL GUIDANCE PATTERN

HEADLAND PARALLEL GUIDANCE PATTERN

SPIRAL GUIDANCE PATTERN

NUDGE COMPENSATION FOR CURVED SWATH PATHS

BACKGROUND OF THE INVENTION

The present invention relates generally to GPS-based vehicle guidance systems and more particularly to a method for adjusting a curved swath path to compensate for changes in vehicle position signals.

Tractors and other off-road work vehicles in the agricultural, mining and construction industries have typically operated with manual steering by the operator. Recent changes in control systems and the development of satellite-based navigation (GPS) systems, including those incorporating differential correction systems, have allowed tractors to operate in semi-automatic or fully automatic steering modes. Combining satellite navigation and ground-based navigation input signals precisely identifying vehicle position and speed with sophisticated on-board vehicle electronic control systems allow the tractor to steer itself with a high degree of accuracy when traversing terrain. The result is that precision farming practices are transitioning from a luxury to a necessity, capable of improving efficiency and yield in common farming operations, such as tilling, seeding, fertilizing, spraying and harvesting.

To provide this control, the prior art teaches using satellite positioning information by an on-board vehicle navigation control system to accurately determine and control a vehicle's position while operating in a field. The operator will typically enter the planned route of the tractor, or let the control system determine the most efficient route. The control methods are well known in the art, and may involve multiple position transmitters or receivers, with various signals used to derive vehicle location, elevation, direction of travel (vehicle heading), attitude, and speed.

The task of precision guidance of an agricultural vehicle involves not only accurately determining vehicle position in a field, but also defining an efficient array of paths to be followed by the vehicle that will, in conjunction with the swath of an associated implement, create an overall swath pattern that efficiently and effectively covers the crop area of a field. The pattern must be located and oriented on the field, and the physical characteristics and limitations of the vehicle and coupled implement must be identified and provided to the navigation system. Implement or header width, location of the implement or header with respect to the vehicle, and limitations on vehicle and associated implement movement, such as minimum turning radius, must also be considered. With this information it is possible to define a series of swath paths for the vehicle to travel in an attempt to cover all cultivatable portions of a field without unnecessary gaps or overlaps.

Calculating the series of paths needed to cover an area without substantial gaps or overlaps is relatively straightforward when straight paths can be used, however, not all fields can be covered in this manner. Many fields require the use of paths having a curvature that varies along at least some portion of its length, whether to follow irregularly shaped boundaries, avoid obstacles within the field, follow topographic contours of the ground, implement agronomic farming practices, or to contour the ground for irrigation. Such conditions preclude a complete reliance on geometrically predefined paths, such as straight lines or constant radius curves. In order to provide generally equally spaced swaths, the path of each adjacent swath must change slightly compared to the prior swath path as the vehicle moves generally transversely across the field (i.e., from one swath to the next) the radius of each curved portion of the swath path varies slightly from the adjacent swath path.

Vehicle guidance systems must be able to store and retrieve swath path information as well as determine new adjacent swath paths from a baseline swath path or create new swath paths from defined starting and ending positions. The number of swath paths to be stored and/or determined increases as the size of the field increases. For swath paths that include variable curvature along their length, the number of positional data points necessary to fully define the swath path between starting and ending points is significantly increased compared to using only starting and ending position points to create straight-line paths. The systems must also quickly present swath path and control information to the operator in an easily understood and useful manner, which requires computational efficiency. As the vehicle operator positions the vehicle near the start of a swath path and prepares to engage the vehicle navigation system, the system must quickly determine if a swath path has been stored in system memory or can be calculated from a swath path stored in system memory and then direct the vehicle to the closest, presumably most appropriate path. If no swath paths are stored in the system memory data exists, then the system must alert the operator and direct the recording of a new swath path or allow the operator to provide a stored swath path from another memory source (i.e., change the removable memory media to one having stored swath path information).

Satellite-based vehicle guidance systems may periodically experience signal drift. Vehicle position signal drift introduces differences between the actual vehicle position and the vehicle position sensed by the vehicle guidance system. In precision farming applications, even slight discrepancies can have significant impact on the swath pattern in a field. As a result, vehicle guidance systems must be able to compensate for signal drift, adjusting the vehicle position sensed by the guidance system to match actual vehicle and implement position in the field.

It would be a great advantage to provide a method and apparatus for creating curved swath patterns for use by a vehicle navigation system that streamlines data storage requirements to reduce demands on the storage and computational elements of the navigation system thereby reducing hardware expense of the vehicle guidance system. Further advantages would be realized if the method and apparatus for creating curved swath patterns for use by a vehicle navigation system was capable of storing path positional data for new paths while the system was engaged in other activities, such as automatic guidance along existing paths so that additional, unproductive travel to memorize points on another path is minimized. Still further advantages would be realized if the method and apparatus recognized vehicle/implement limitations in following a defined path and adjusted such paths accordingly. Still further advantages would be realized if the apparatus were capable of receiving periodic adjustments to the vehicle position signal and accurately altering generated paths to account for signal drift. These and other advantages are provided by the method and vehicle guidance system described below.

SUMMARY OF THE INVENTION

Accordingly, it is an object of the present invention to provide a GPS-based vehicle guidance system with a series of paths defining swaths that are generally parallel to an initial swath.

It is another object of the present invention to provide a GPS-based vehicle guidance system that can memorize and store an initial swath path to be used to generate successive swath paths, whether the initial swath path is memorized during an actual traversing operation or recalled from a stored swath path.

It is another object of the present invention to provide an efficient GPS-based vehicle guidance system that determines the positional data points to store to limit required data storage capacity, improve computational efficiency, and avoid certain known computational issues.

It is a further object of the present invention to provide method and apparatus for creating curved swath patterns for use by a vehicle navigation system that can be adjusted while in operation to account for signal drift in the GPS position signal.

It is a further object of the present invention to improve system performance by providing a method for limiting the total number of swath paths stored in memory that balances the number of stored swath paths with the time required to recalculate swath paths that are not stored in memory.

It is a still further object of the present invention to provide a method and apparatus for generating curved swaths that is capable of simultaneously storing position data points for one or more swath paths and providing the position data points for another swath path to a vehicle guidance system for automatic vehicle guidance along a swath path.

It is a still further object of the present invention to provide a method of adjusting a baseline swath path to accommodate a variety of implements having differing swath widths.

It is a still further object of the present invention to provide method and apparatus for determining an array of generally parallel paths for an agricultural vehicle positioning system that is durable in construction, inexpensive of manufacture, carefree of maintenance, easily assembled, and simple and effective to use.

These and other objects are achieved by providing method and apparatus for defining a desired series of generally parallel paths and communicating the desired path definition information to a vehicle guidance system.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Any reference herein to the terms "left" or "right," "up" or "down," or "top" or "bottom" are used as a matter of mere convenience and are determined by standing at the rear of the vehicle facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

The swath generation methodologies described herein may find application in precision agriculture systems used to control crop spraying operations, harvesting operations, cultivation and plowing operations, planting and seeding operations, fertilizer application, or other operations where highly accurate positioning information is used in conjunction with defined patterns of swaths to control transit of a vehicle over a land area. Such systems for precision location determination are generally well known and are exemplified by those disclosed in U.S. Pat. Nos. 6,199,000 and 6,553,299, each entitled "Methods and Apparatus for Precision Agriculture Operations Using Real Time Kinematic Global Positioning Systems" which are incorporated herein in their entirety by reference. Although the various methods will be described with particular reference to GPS satellite-based systems. It should be appreciated that the teachings are equally applicable to guidance systems using other methods to determine vehicle position.

Figure 1:
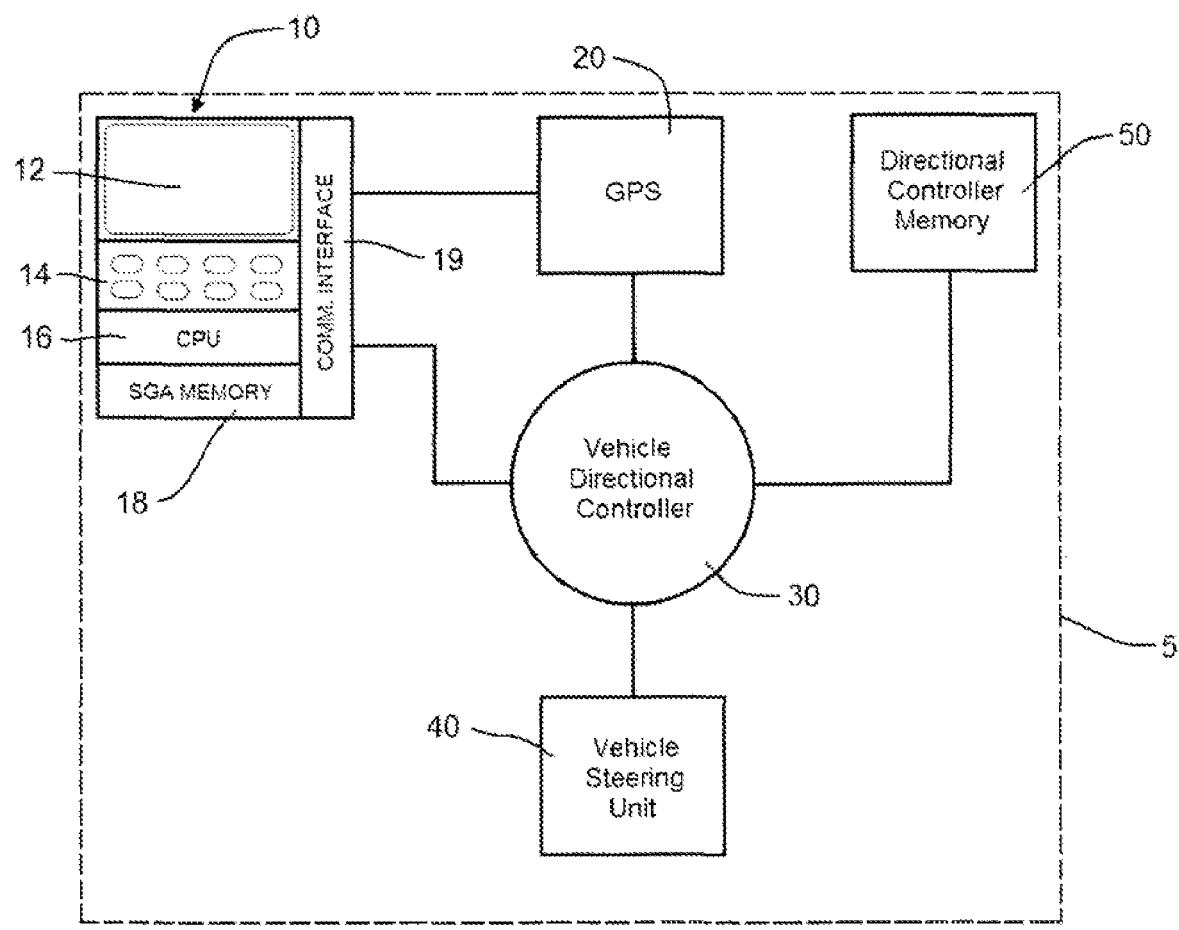
FIG. 1 shows a schematic diagram for a typical GPS-based vehicle guidance system of the type the present invention is useful.

An automatic GPS-based vehicle guidance system 5, seen schematically in FIG. 1, is of the type commonly used in agricultural and construction operations and is located on an agricultural tractor or similar prime mover to simplify the task of driving the vehicle. The vehicle guidance system 5 is located on a tractor and includes a directional controller 30, a global positioning system receiver (GPS) 20, a swath generation apparatus (SGA) 10, and a steering unit 40 communicatively coupled in a manner that enables each to send and receive data and/or control signals. The steering unit 40 preferably includes proportional or directional control valves that are hydraulically connected to a steering actuator for the tractor. The vehicle guidance system 5 continually calculates a vehicle steering heading by comparing vehicle position and directional heading to a desired travel path provided by the SGA 10, and sends the vehicle steering heading to the steering unit 40, which in turn actuates vehicle steering (i.e., steered wheels), thereby changing the vehicle heading. The vehicle navigation system 5 may further include other sensors, such as vehicle yaw and roll, implement hitch angle, and the like, which would also be communicatively coupled to the vehicle guidance system 5 and adjust the vehicle position signal to compensate for such vehicle movements. Though shown as discreet devices, the functions of the directional controller, swath generation apparatus, and other portions of the vehicle guidance system can easily be integrated into a single apparatus within the intent of this invention.

The directional controller 30 is typically a microprocessor-based apparatus that receives near real-time position information from the GPS 20, compares the then-current vehicle position with the intended position along a swath path (provided by the SGA 10), and directs an output signal to the vehicle steering unit 40 to cause the vehicle to be steered toward the intended position. The vehicle guidance system 5 shown is representative of numerous GPS-based vehicle guidance systems in which a SGA 10 incorporating the present invention may prove useful.

The SGA 10 is preferably mounted inside the operator compartment of the tractor to be easily accessible to the operator. The SGA 10 preferably includes a visual display 12 and an operator input device 14 to enable the operator to interface with the vehicle guidance system 5, and a microprocessor 16, an SGA memory 18, and a communication interface 19 that allows the SGA 10 to communicate with other components of the vehicle guidance system 5. The operator input device 14, of which examples include keyboards, touchpads, joysticks, and the like, may be integrated into the visual display 12 (e.g., a touch-screen) so that task-specific "keys," can be easily provided in a compact format or modified by software changes. The SGA memory 18 preferably comprises a removable memory media for all or a portion of the total SGA memory that allows stored swath path information to be conveniently moved and shared among multiple vehicles or with other computer system (i.e., an office computer system). When removable media is utilized, the SGA memory 18 may function as yet another variation of the operator input device 14. The SGA 10 provides computational capability thereby allowing the directional controller 30 to be dedicated to the task of guiding the vehicle along a desired swath path determined by the SGA 10. The primary task of the SGA 10 is to memorize a baseline swath, efficiently store the position data for points along the baseline swath path, generate additional, generally parallel swath paths that, in the aggregate, define a swath pattern that covers the crop growing area of a field, and efficiently communicate the swath path information, as needed, to the directional controller 30. The SGA 10 is also tasked with accepting operator inputs that may require changes to a baseline swath path and efficiently recreating a revised baseline swath path from which other swath paths may be created. These changes may be in the form of a "nudge" that alters the swath path to compensate for variations in the vehicle position signal or a lateral shift of the swath path needed to adjust the swath path for implements of differing widths.

The SGA 10 is configured to receive information about the field to be processed from the operator and to selectively transmit the swath path definition information to the directional controller 30. Input information may include field information (e.g., name, location, size, and boundary locations), the operations to be performed, the implements to be used while processing the field, and the geometry of each implement. Input information may be manually input via the operator input device 14, but is more conveniently transferred into the SGA using a removable module for the SGA memory (e.g., a portable memory card) so that the operator can select from stored information. Information can be entered into portable memory cards by numerous means, including computers which offer greater ease and efficiency for such operations compared to performing them while seated in the vehicle ready to commencing farming operations. An alternate embodiment uses common wireless technology to transmit general input information and a baseline swath path definition to the SGA further enhancing the SGA's ability to share stored swath path information.

With basic information about a field entered, including a baseline swath, the operator may select a desired swath path and swath pattern type from those available in SGA memory 18. Alternatively, the operator may choose to define and store a new swath path and/or swath pattern in the SGA memory. Once a baseline swath is identified or selected, the SGA 10, in accordance with its internal programming, will create a swath pattern comprising a series of additional swath paths that will, as a whole, define a series of swaths that, based on specific vehicle and implement characteristics, cover substantially all of the crop growing area of a selected field. In the preferred embodiment of the present invention, not all swath paths are created and retained in SGA memory. The method used in the present invention creates a limited number of the total number of swath paths needed and then, based on movement of the vehicle in the field, calculates additional swath paths when needed. As the vehicle is positioned near an end of a swath and the vehicle guidance system is engaged, information defining the desired swath path is communicated by SGA 10 for use by the directional controller 30 to manage vehicle movement along the desired path. The rate of communication of swath path information may be varied so that SGA 10 provides swath path position data points at an optimal rate for the directional controller used in the vehicle guidance system.

Figure 2:
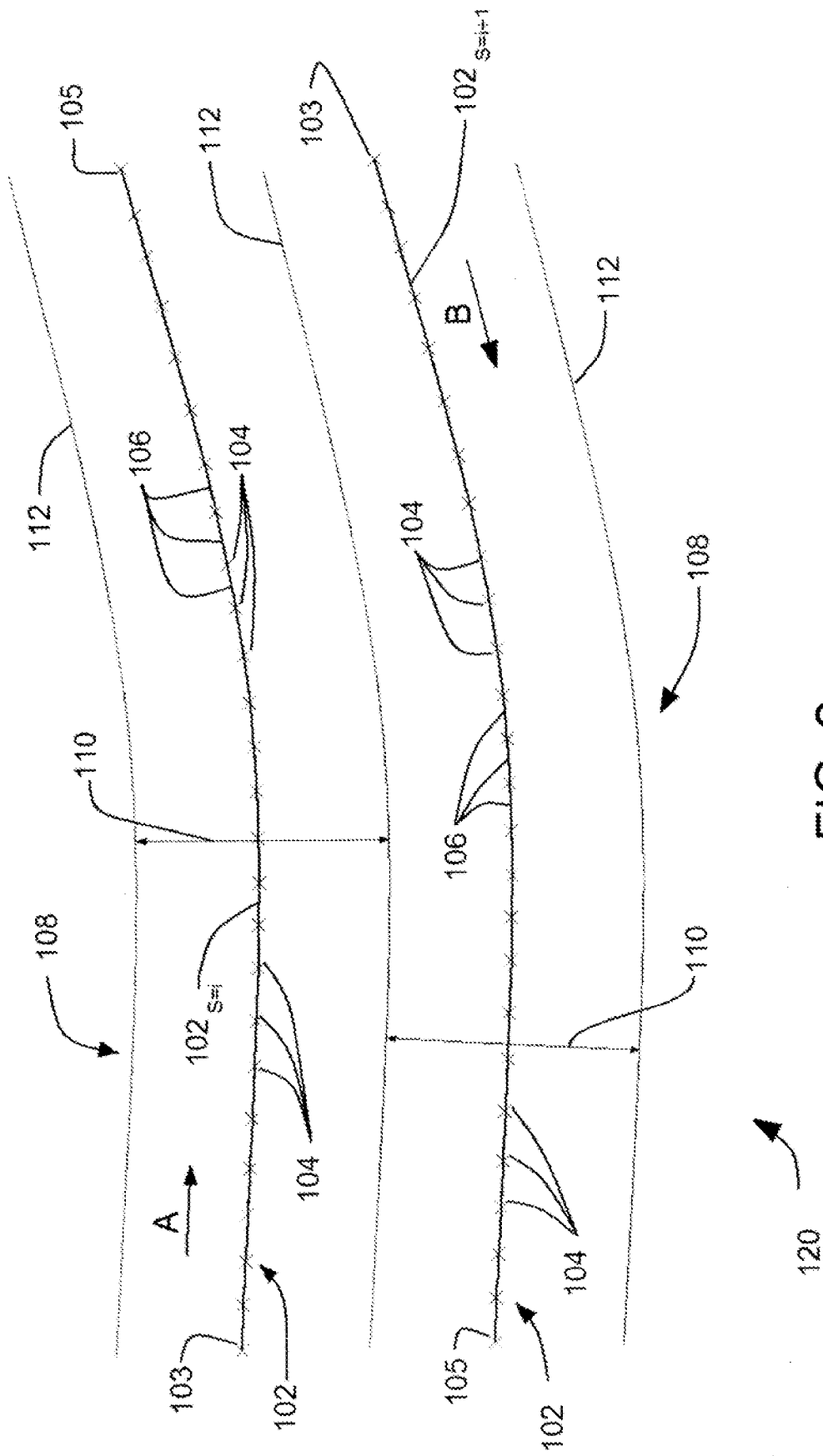
FIG. 2 shows a portion of a pair of swath paths and illustrates the nomenclature used in a curved swath path generation method and apparatus.

Referring now to FIG. 2, there is shown a portion of a typical curved swath arrangement in a field. A swath 108 is created when an implement having an effective working (swath) width 110 traverses a swath path 102 over the ground. The implement may be a single-use self-propelled unit, or may be pushed, towed, or otherwise connected to a prime mover traversing the swath path 102. Swaths 108 are defined by a plurality of position data points 104 spanning from a beginning position 103 to an end position 105. Swath segments 106 connect adjacent pairs of position data points 104 along each swath path 102. A swath pattern 120 is comprised of one or more swaths arranged so that substantially all of the tillable area of a field is covered by the swaths 108, shown as swath paths $102_{s=i}$ and $102_{s=i+1}$. In an agricultural application, a farmer typically processes a field in long swaths turning at the end of a first swath after having traversed the swath, and returning to the starting end of the field along a second swath path that may be adjacent to the first swath path depending upon the swath pattern used. If the farmer processes the field topographically (contour plowing), a curved path typically defines each swath. As they move through the field, the tractor and the implement will create a distinct swath pattern through the field. The object is for the swath pattern to cover as much of the crop planting area of the field as is practical while minimizing the portions of the area that are covered multiple times.

Straight-line swath paths in a pattern of generally parallel swaths are the simplest form. The initial swath path definition requires identifying two points, generally the beginning 103 and end 105 points of a first swath 102, designated as S=1, having a single swath segment 106 therebetween. Upon identification of these position data points, internal programming within the SGA 10 will generate a series of swath paths transversely spanning (i.e., generally perpendicular to the direction of vehicle travel) the defined field boundary. Each swath path may be designated as S=i where i ranges from 1 to n and n is the total number of generated swath paths needed to transversely span the field. As each straight-line swath path may be defined by only two position data points, data storage and numerical computation demands are minimal and do not impose significant demands on the SGA 10 processing and storage resources.

Swaths containing one or more curved portions require additional actions by the SGA 10 since the number of position data points 104 needed to define a swath path 102 are increased. Swath paths may be memorized by driving a vehicle along a first swath path while recording position data points along the way. Swath paths may also be defined remotely (e.g., from a location other than on a vehicle) using detailed maps or by storing position information from earlier passes over a field and stored in the SGA memory 18 incorporating a removable media that allows the information to be readily used by multiple vehicles relying on the present swath generation apparatus. Upon reaching a field to perform an operation, the operator enters information identifying the field, implement, and operation to be performed via operator input device 14 of the SGA 10. If no swath information is available, the operator will be directed to manually drive and store information defining the first swath path, S=1 into memory. If the swath has been previously stored, the SGA 10 recalls the swath information and proceeds with swath generation.

The present invention also allows new swath path information to be stored to SGA memory while the SGA is engaged (automatically tracking) another swath path. For example, the starting and end points for a new straight-line swath path could be stored to SGA memory while the vehicle is being automatically guided around the perimeter of a field. Once the headland swath pass is completed, information for a new baseline swath path bounded by the headland swath would then be available for the SGA to create a series of swath paths covering the area within the headland swath. In the absence of this capability, the operator could be forced to direct the vehicle to the starting and end points of a new interior baseline swath path after completing the headland perimeter swath, requiring additional, non-productive vehicle travel.

Each subsequently generated swath path $102_{S=i+1}$ is offset from the adjacent swath path $102_{S=i}$ by the effective working width 110 (swath) in an iterative manner resulting in an array of swath paths, each having a shape slightly different from the one from which it was generated. Once generated by the SGA, the swaths may then be communicated to and used by the vehicle navigation controller. Many systems determine the path by computing a parallel path an integral number of implement widths from the initial path (S=1) so that the initial path remains the baseline. In the present invention, each subsequent swath path (S=i+1) is offset from the swath path immediately adjacent thereto (S=i) using a perpendicular offset method. By calculating the offset from the adjacent swath paths minor swath path adjustments that an operator may introduce will be carried through to the subsequently created swath paths. This approach also causes the curvature of each path to differ slightly from the adjacent path from with it was created, especially in areas where the radius of curvature equals the minimum turning radius of the vehicle and its associated implement. Changes in shape from one swath path to the next occur as the radius of curvature is increased or decreased to maintain the edges of the swath close together. Cases in which the radius of curvature is decreasing from one swath path to the next may eventually reach the minimum turning radius limit of the vehicle and associated implement. When this limit is reached, the subsequent swath path curvature will have a different shape than the swath path from which it was generated and there will be gaps between adjacent swath in the area of minimal radius curvature.

Figure 3:
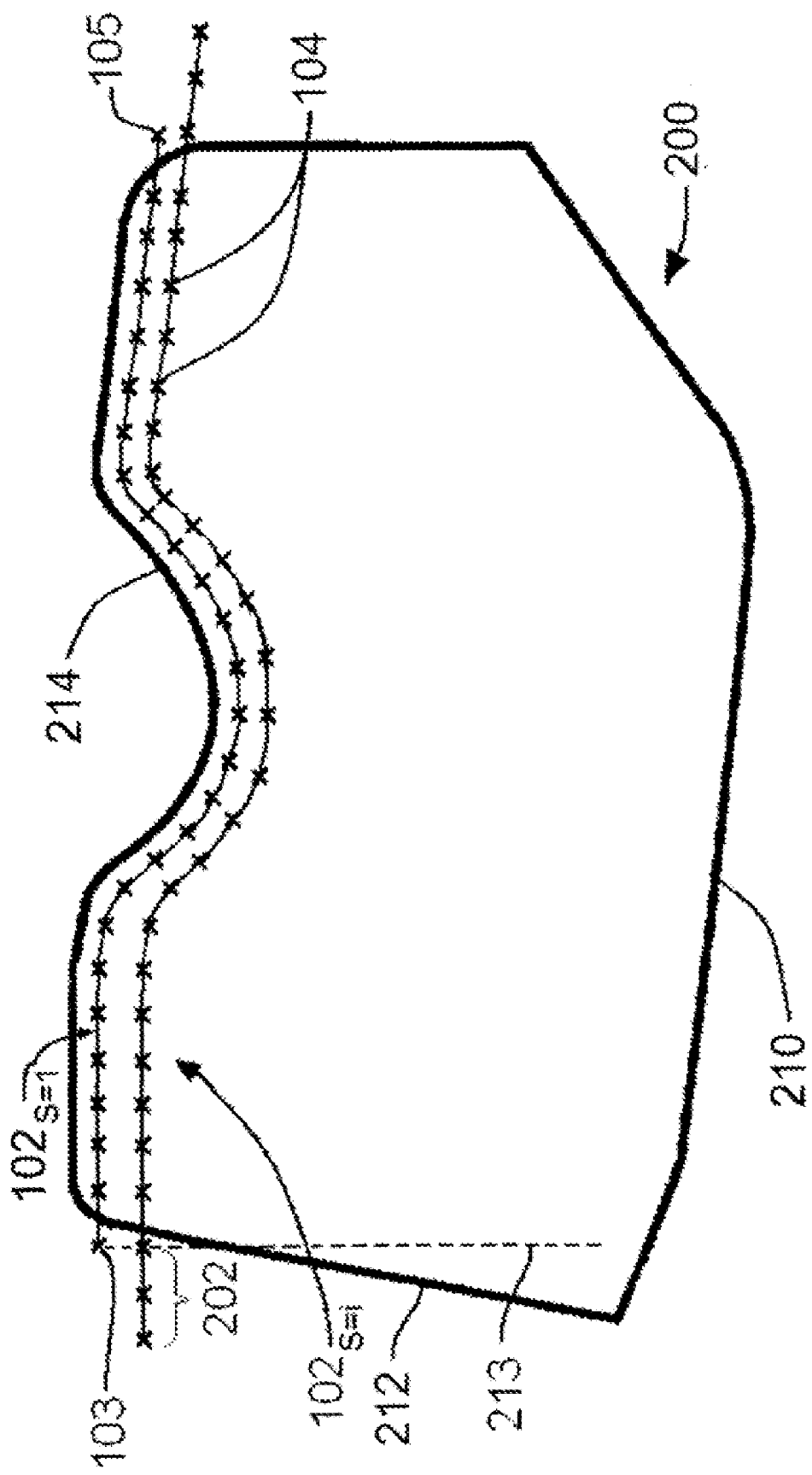
FIG. 3 illustrates a baseline and subsequent curved swath paths in a field with individual position data points shown.
Figure 4:
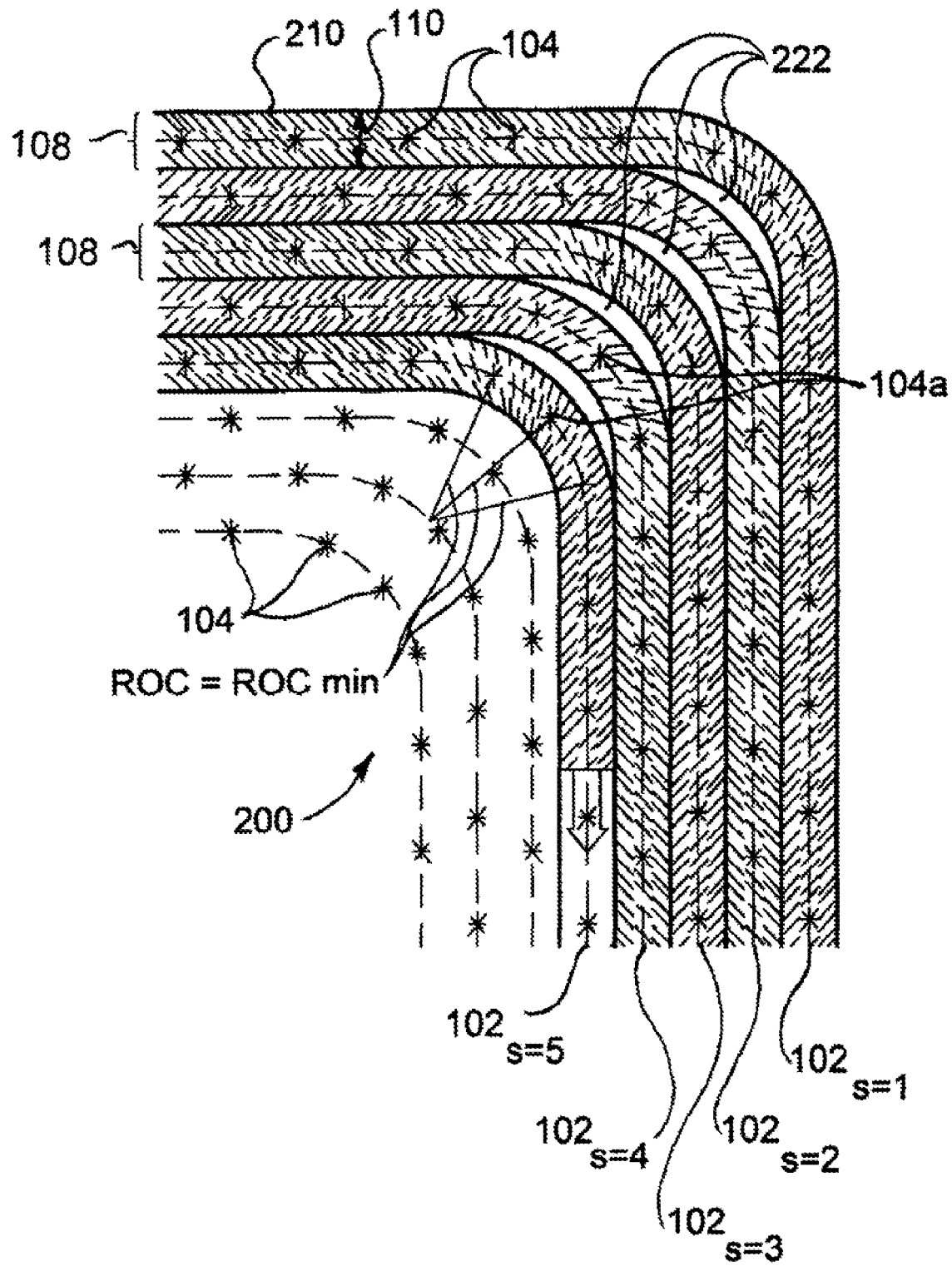
FIG. 4 illustrates some typical swath paths showing coverage gaps caused by minimum turning radius limitations.

Referring to FIGS. 3 and 4, a typical field 200 bounded by a perimeter 210 is shown. A baseline swath path $102_{S=1}$ having a series of position data points 104 is shown in FIG. 3 extending across the field 200, following the irregular boundary 214 of perimeter 210. End boundary 212 illustrates a common problem in swath generation, that of a portion of a field perimeter that requires extending the length of later-generated swath paths in order for the paths to reach the field perimeter 210.

Programming instructions executing in the CPU 16 of the SGA 10 generate the additional swath paths $102_{S=i}$ (only one is shown) from initial swath path 102, needed to cover the entire area of field 200. The ends of the recalled swath path $102_{S=1}$ are extended beyond the original beginning 103 and end 105 points so that each subsequently generated swath (S=i+1) is longer than the swath from which it is calculated (S=i). Extending the length of each swath assures that generated swath paths $102_{S=i}$ have sufficient length to account for irregularities in the field boundary so that a vehicle traversing a swath path will not reach the end of the swath generation apparatus defined swath path prior to reaching the field boundary. This is illustrated by line 213 in FIG. 3 which shows the location of the ends of the generated swaths if no extensions were made. Each swath path end is extended by a pre-defined amount, balancing an anticipated amount of boundary irregularity with information storage requirements for the additional swath definition information. Extensions are determined using straight-line interpolation from the outermost two position data points on each end of the swath.

Path definition for efficient system performance requires balancing the number of position data points needed to provide the desired directional control input to the directional controller 30 against the burden on the computing and memory systems resulting from working with large amounts of positional data. Typical satellite-based systems calculate position at a fixed time interval, generally around 5 Hz. Storing data for path position at this rate would require vast resources and burden system computations by using unnecessarily closely-spaced data points to define paths. Such closely-spaced positional data points do not proportionally improve the system path-following capability. The recalled baseline swath path $102_{S=1}$ is optimized for the number of position data points 104 defining the swath path $102_{S=1}$. The present invention optimizes computational efficiency by limiting the number of position data points on a swath path 102 such that position data points 104 are spaced at least one meter apart and not more than twenty-five meters apart along the swath path 102. Excess position data points are removed from recalled swath paths having position data points spaced more closely than necessary. Additional position data points are created for swath paths having position data points spaced further apart than the target spacing using linear extrapolation between adjacent points. For agricultural applications spacing in the present invention is further limited to between approximately three and ten meters to provide sufficient curve definition for input to the vehicle guidance system.

During swath recording the SGA 10 receives position input from the GPS receiver 20 in the vehicle guidance system 5 (typically at 5 Hz). GPS position data is received in geodetic form. For computational ease since swath width is usually defined in units of length, the position data is converted to Cartesian coordinates within the SGA 10. Internal programming in the SGA 10 then discards position data points until the swath path is defined by a series of data points of the desired spacing interval. As shown in FIG. 3, the baseline path $102_{S=1}$ is thus defined by a series of positional data points 104 along the swath path from beginning point 103 toward first swath end point 105. A second swath path $102_{S=i}$ (i is equal to 2 in this case) is derived by offsetting the position data points from initial path $102_{S=1}$ by the swath width 110 using a perpendicular offset from each data point in the baseline swath path $102_{S=1}$.

As can also be seen in FIG. 4, the location of baseline swath path $102_{S=1}$ may be affected by changes in the swath width 110, especially when the field perimeter 210 is defined by an obstruction, such as a fence. Upon receiving a swath width input different from the swath width on which the baseline swath path was developed, the operator may direct the SGA 10 to remark (shift laterally) the recalled baseline swath path to account for the change in the swath width so that an obstruction along the perimeter of the field 210 is avoided. The shifted baseline swath path is then stored as a new baseline swath path for use with the selected implement.

Having established a baseline swath path $102_{S=1}$ with the desired spacing of position data points, the SGA 10 compares the radius of curvature (ROC) for each position data point 104 along the swath path to minimum turning radius for the vehicle and associated implement. The ROC for each position data point is determined from at least three adjacent position data points 104 (a triplet) including the position data point being evaluated. The ROC is determined by calculating the radius of a circle intersecting the three adjacent data points being evaluated. Curved portions of each swath path 102 are defined as at least three points along an arc of a circle so that the number of data points for adjacent swath paths remains substantially the same. Normally a recorded swath path 102 should not have turns with radius of curvature less than the minimum turning radius of the vehicle/implement. Problems arise when a recalled baseline swath path $102_{S=1}$ was recorded with a vehicle/implement combination having a smaller minimum radius than the implement presently in use or as the created swath paths converge near the middle of a perimeter-bounded field. In such cases, the swath path, $102_{S=i+2}$ in FIG. 4, is corrected so that the swath path includes no arcs having a radius less than the minimum turning radius of the vehicle/implement. Corrected swaths will have skips or gaps 222 in the coverage of the swath pattern in regions surrounding the swath path correction. Swaths in which two or more adjacent data points cause a radius of curvature to be less than ninety percent of the minimum turning radius limit cannot be corrected. In such circumstances, the SGA 10 alerts the operator that a manual swath correction is required.

When a triplet having a radius of curvature less than the minimum turning radius limit ($ROC_{min}$) is identified the ROC for each position data point within the triplet is calculated. Beginning with the first position data point (referred to as a violating point 104a), the SGA attempts to fit a circle having a radius equal to the turning radius limit ($ROC_{min}$) to the position data points adjacent the violating point such that the circle tangentially intersects the swath path on both sides of the violating point 104a. If the circle does not tangentially intersect the swath path on either side of the violating point, the SGA expands the curvature area to include the next adjacent one position data points on either side of the first triplet examined and again attempts to tangentially fit the a circle into the curvature, repeating the process until a tangential circle having a radius equal to the turning radius limit is identified or until the spacing between the violating points and their adjusted positions exceed approximately twice the value of the turning radius limit. When a tangential circle is identified, the violating points are repositioned to follow an arc of the circle between the tangential intersection points to an adjusted swath path in the curve. This swath path adjustment method results in small gaps 222 in the overall swath coverage pattern for the field.

The recalled swath (S=1) and each subsequently generated swath (S=i) must be tested to see if the swath path crosses (intersects) itself. Generating subsequent swaths from a path that crosses itself causes problems in that a single position in the field could have multiple swaths paths crossing that position. The vehicle guidance system will generally engage the swath path closest to the vehicle's then-present position, which may not be the swath the operator intended to engage. Crosses in swaths also create areas in a field that are covered multiple times by the vehicle/implement; planting, fertilizing, and spraying operations are typically optimized for a single pass over a particular area of the field. Testing for crosses is an efficient method for preventing swaths from covering a portion of the field multiple times. Computational efficiency is also promoted since once a swath path is checked for crosses (and adjusted, if necessary), subsequent swath paths generated from the original swath path need not be checked to see if they intersect themselves. It is also desirable to eliminate even "near" crosses since they will also lead to problems detecting the closest swath path to the vehicle. Any swath path that loops to within approximately one swath width from another portion of itself is handled by the system as though the path is crossed. This will allow "pseudo-spiral" curves to be generated, which are similar to spirals, except the operator must re-engage automatic after each rotation, since swath paths will end with each rotation due to a near-cross condition.

Figure 5:
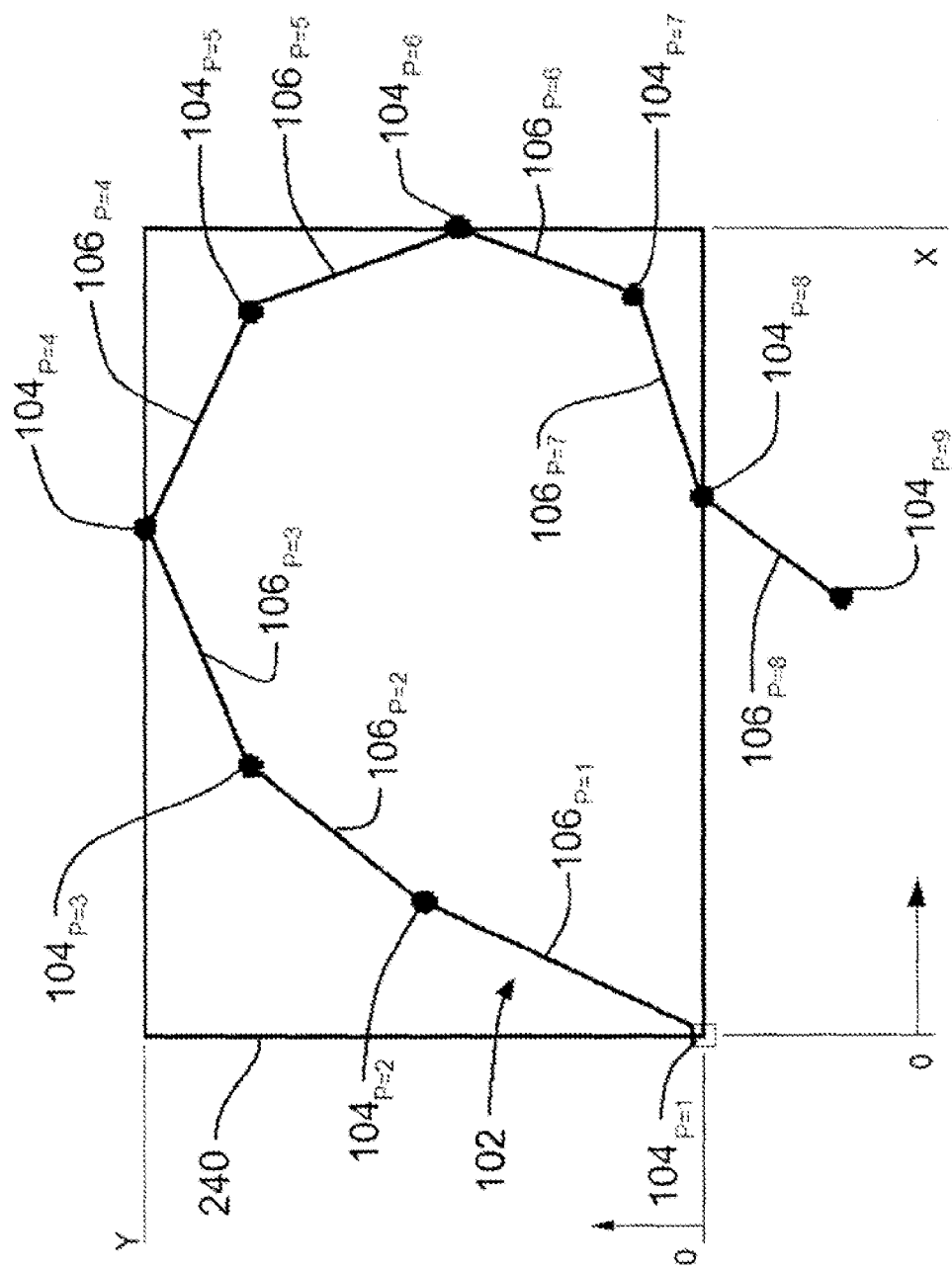
FIG. 5 illustrates the method for checking for the presence of intersections in a single swath path.

Referring to FIG. 5, wherein a portion of a swath path is shown, the SGA tests for crosses in the baseline swath path 102 using an sequential approach that considers the possibility of a cross for each swath path segment $106_{P=n}$ (i.e., swath path between two adjacent position data points) along the swath path 102. The entire length of the swath path 102 will be checked commencing with a first segment $106_{P=1}$ at one end and progressing toward the other, generally following the direction of travel used when the swath path was first recorded. The second swath path segment $106_{P=2}$ does not need to be tested against the first segment since it cannot cross. Commencing with the third segment $106_{P=3}$, an examination area 240 is designated around swath path segments. Examination area 240 is defined using a Cartesian coordinate system as having a minimum and maximum value in the X direction and a minimum and maximum value in the Y direction derived from the extreme-most position data points. As each new segment is added to the evaluation group, the size of examination area 240 is checked for changes in the X and Y values. In swath paths having no crosses each new segment should expand the size of the examination area by establishing new bounding absolute values for X and/or Y based on the added position data points.

If the new swath path segment is outside of the examination area, then the most recent segment added is confirmed to not to cross any of the other swath path line segments. This is illustrated in FIG. 5 by swath path segments $106_{P=1}$ through $106_{P=5}$. The inclusion of each successive segment up through segment $106_{P=5}$ causes examination area 240 to expand indicating that the swath path does not cross or nearly cross itself in the first five segments. However, the inclusion of swath $106_{P=6}$ which has an end point at position data point $104_{P=7}$ does not cause the examination area 240 to expand since point $104_{P=7}$ is located within the examination area defined by the first five swath path segments indicating that the possibility of a cross exists and must be further examined.

If a swath path segment is not entirely outside the examination area (i.e., at least a portion of the path segment lies within the examination area), then the segment must be tested against each and every swath path segment previously tested back to the beginning of the swath path. All the previous segments must be tested regardless of whether the segments were inside or outside of the examination area defined up to the potentially crossing segment (the examination area defined up to segment $106_{P=6}$ in FIG. 5) when they were initially tested. Swath path segments $106_{P=6}$ and $106_{P=7}$ both fall within the examination area defined up to the time they were included in the examination and must therefore be check to see if they cross or nearly cross each preceding path segment. Swath paths determined to cross themselves must be modified before subsequent swath paths are created therefrom. Position data points located between the cross location and both ends of the swath path are deleted from the swath path definition to prevent problems with swath paths created from the modified and previously crossed swath path. This will ensure that these swaths will not overlap or cross existing swaths.

Each swath path segment should also be tested for the existence of near crosses. A simple range check calculating the minimum and maximum X position value and minimum and maximum Y position value for each of the swath path segments is performed to see whether any two swath path segments fall within approximately one swath width of each other. Upon a first detection of a near cross in a particular direction (left or right) of the baseline swath path, all of the position data points along the swath path following the position data point of the near cross are deleted. Swath paths generated by the SGA from a baseline path in the particular direction will be based on this shortened swath. Once a generated swath path has a near cross in a particular direction and subsequently generated swath paths are found to have near crosses, all the position data points towards both ends of the swath path from the point of the near cross are deleted such that the resultant swath path takes the form of a loop. This will ensure that these swaths will not overlap or cross existing swaths. No further cross checking is needed on the swath path. Eventually, curves within the generated swath paths will become too tight and the radius of curvature test will fail. No further swath paths will be generated in the direction of swath path generation.

If no crosses in the swath path were detected, then SEA checks the total heading change of the swath path. The total heading change is calculated by determining a directional heading for each pair of consecutive position data points in the swath path and creating a running total of the heading changes along the length of the swath path. If the total heading change is less than or equal to 180 degrees, the swath path does not cross itself, it may then be used for swath path creation. In the event the total heading change of the swath path is greater than 180 degrees, the swath path may be unsuitable for subsequent swath path generation. In such circumstances, both ends of the swath path are extended by a defined amount of at least the total length of the swath path and the checks for crosses and near-crosses re-performed. If no crosses or near-crosses are detected in the second check, the swath path is suitable baseline for swath path generation.

Figure 6:
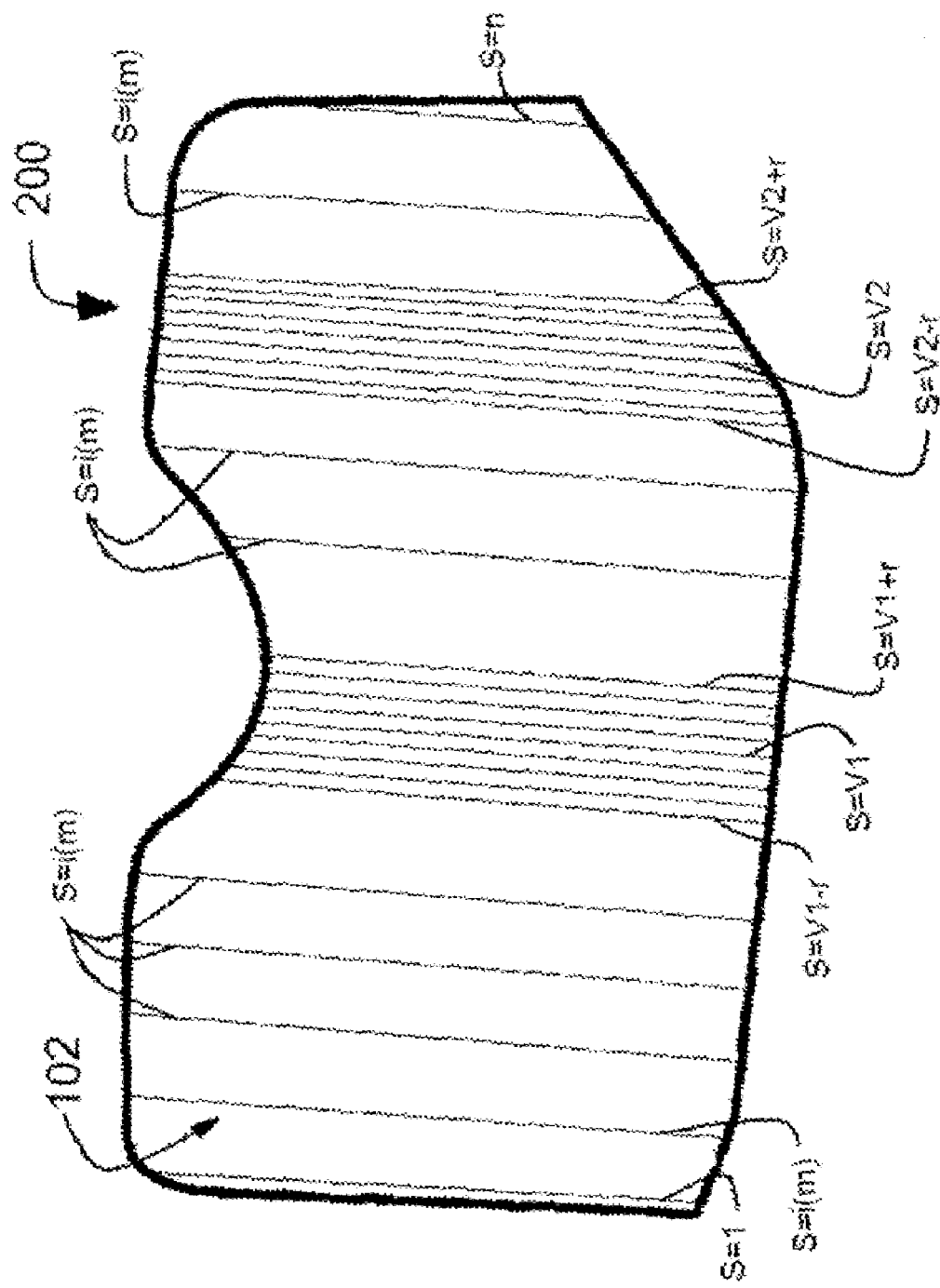
FIG. 6 illustrates the method for limiting the number of swath paths retained in the system.

Now referring to FIG. 6; a field 200 requiring a large number of swaths to cover the crop planting area is shown. After a recalled swath path has been checked for position data point spacing, radius of curvature, and crosses, the SGA 10 will generate swath paths to be communicated to the navigation system 30 for automatically steering the vehicle. The total number of individual swaths, which may be designated as S=n, in the swath pattern varies with the size and shape of the field, implement characteristics, and general swath pattern. Fields of large size may require many swaths in order to completely cover the area of the field which results in large quantities of information describing the curved swaths.

In order to limit the amount of swath information the SGA 10 needs to store in memory 18 at any one time, the SGA 10 limits the number of swath path definitions retained in memory to those swaths in the vicinity of the vehicle and periodic swaths across the remainder of the field. Swaths in the vicinity of the vehicle are the most likely to be selected by an operator and thus readily available for selection without imposing any delay while swath path are calculated. As illustrated in FIG. 6; if the vehicle is located at a first position, near swath S=v1, the SGA generates a range of adjacent swath paths on either side of the vehicle. These may be designated as swath paths between S=v1−r and S=v1+r. In the event the operator moves the vehicle to a different portion of the field; the SGA 10 can easily calculate the missing swath paths between those swath paths that were saved to fill in the gap between the periodic swath paths that were stored in memory. In the illustration, the operator repositions the vehicle to a second position, near swath S=v2, and the SGA recalculates swath paths in the range of the vehicle position, shown as swath paths between S=v2−r and S=v2+r. Only a limited number of swath paths outside of the range are retained in SGA memory, designated as S=i(m); if other swath paths are needed, the SGA recalculates the swath paths from the nearest (in the direction of the baseline swath path S=1) stored swath path. One objective of this approach is to maintain a range of pre-calculated swath path within the SGA memory where they may be quickly recalled and engaged by the SGA and directional controller. As the vehicle progresses across a field, the range of readily available swath paths shifts along with vehicle position so that a range of pre-calculated swath paths surrounding the vehicle is always available in the SGA so that the operator can select and engage (or the SGA may automatically engage) a swath path without a computational delay. In the preferred embodiment of the present inventions the range of swath paths on either side of the vehicle position is approximately ten and may be varied in either direction to optimize the balance between computational and memory storage capability of the SGA. This range of swath paths is calculated and stored in memory. Outside of the ten swath path range, only approximately every tenth swath path is stored. In the illustration, the stored swaths could be designated as S=i(m) or, more conventionally as a series such as S=1, S=10, S=20, and S=30 for as many are needed to span the field. In the event the vehicle is moved to a portion of the field more than ten swaths away from a given position, the system need only calculate no more than eighteen swath paths in order to have ten swath paths on either side of the then-present vehicle location.

Figure 7:
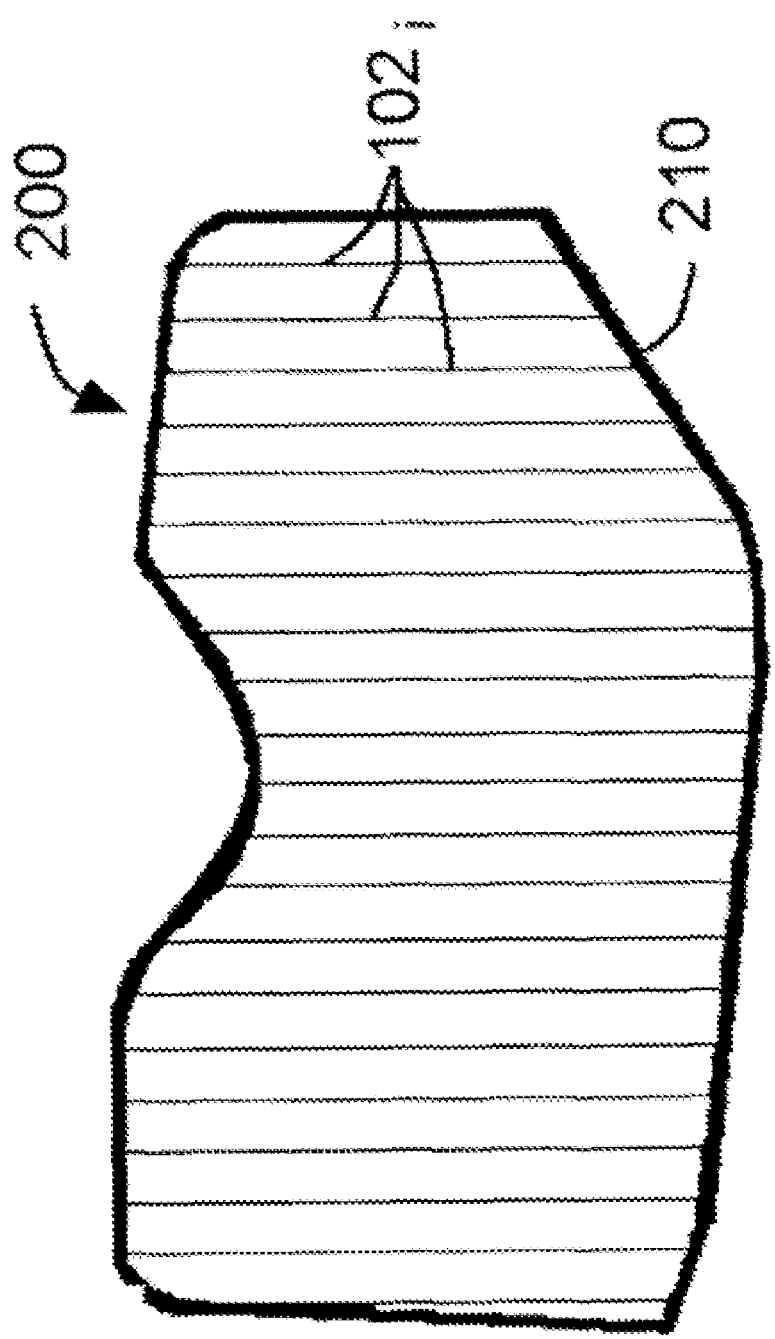
FIG. 7 illustrates typical swath paths for a vehicle guidance system using a parallel swath path pattern to cover a land area.
Figure 8:
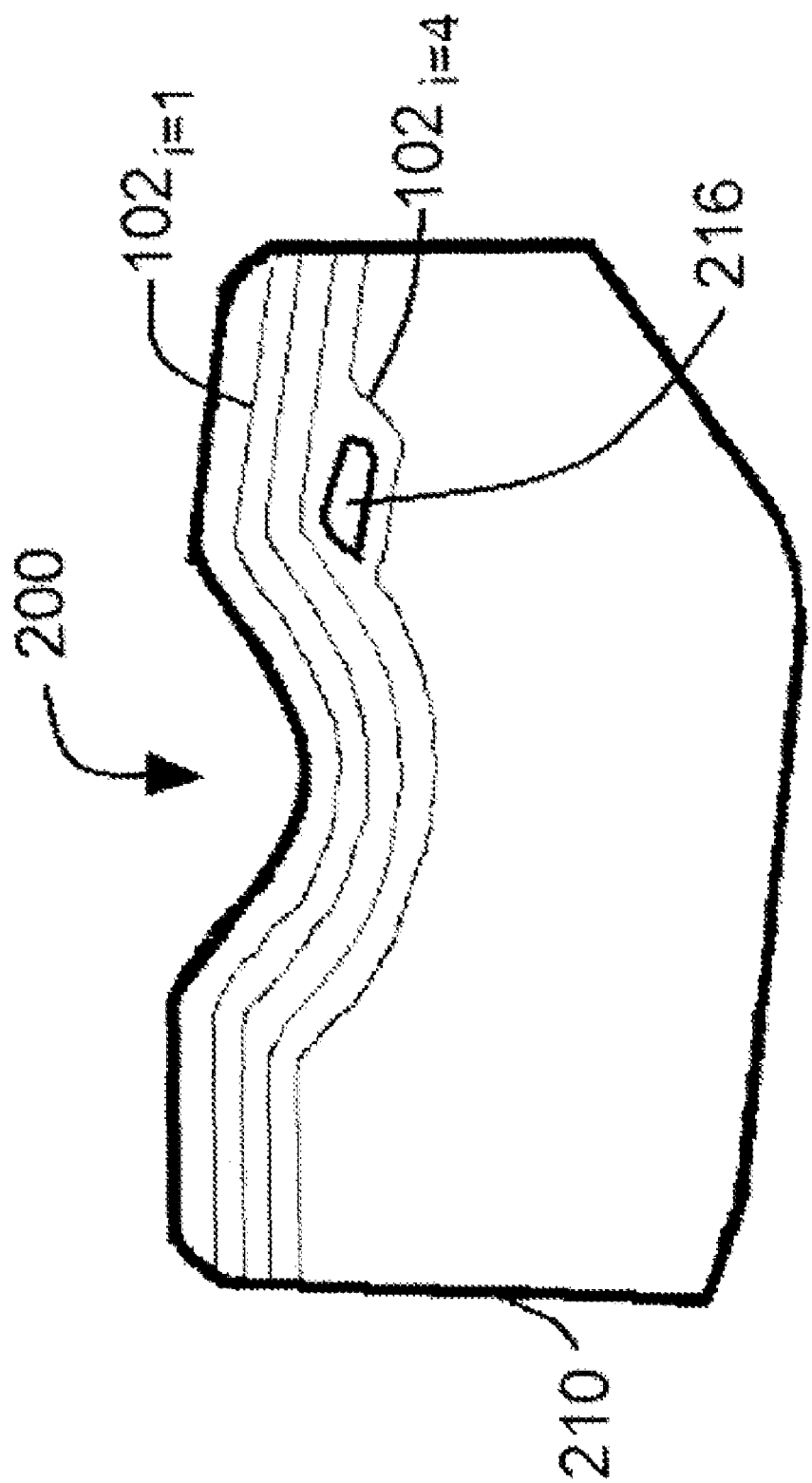
FIG. 8 illustrates the swath paths for a vehicle guidance system using a curved parallel swath path pattern to cover the land area.

Referring now to FIGS. 7 through 10, common swath patterns used in agricultural operations are shown. A land area, or field 200 is shown defined by an outside perimeter 210. The field may contain agricultural crop or the like and thus require periodic traverse by an agricultural implement. The field perimeter 210 is irregular and typical of conditions likely to be encountered during most agricultural operations. As shown in FIG. 8, field 200 may also include one or more obstacles 216, such as trees, rocks, or other obstructions, within the perimeter whose position must be provided to a navigation controller 30 by the SGA 10 so that path alterations can be calculated and the obstacles avoided. On systems lacking automated steering control, the vehicle directional control is accomplished by an indicator (i.e. light bar), that shows how far left or right the vehicle's location is to the desired path and allows the operator to input the necessary steering corrections. Most systems have the capability to pause and suspend automated directional control, typically accomplished by manually turning the steering wheel, to allow the operator to leave a field mid-swath or to allow manual end of swath row turning.

FIG. 7 illustrates a straight-line parallel path swath pattern comprising a series of generally parallel swath paths $102_i$ which span the width of the field 200. An operator would typically begin at a first swath path (i=1) and traverse along the path. Upon reaching the opposite side of the field, the operator would turn the vehicle in preparation for a second pass along an adjacent swath path (i=2) separated by a distance generally equal to the width of the implement being used. The vehicle continues this pattern, automatically following each swath path until the swaths generated by the swath paths reach the opposite side of the field. As the vehicle traverses the series of swath paths, the implement will cover substantially all of the field area.

In FIG. 8, field 200 is shown having a curved parallel swath path guidance swath pattern. Such swath paths are useful in fields having irregularly shaped perimeters 210 or when topographic contour planting is desired. In topographic contour planting, crop rows are arranged to follow a generally constant elevation line in a field, generally requiring numerous curved sections in the swath path. Similar to straight-line parallel swath paths, subsequently generated swath paths are offset from an initial swath path by an effective implement width. Unlike parallel straight-line paths that require only two position data points to define, curved paths may require many position data points to define.

As can be seen in FIG. 8, the fourth swath path $102_{i=4}$ requires alteration to avoid obstacle 216. The vehicle will not be able to follow fourth path $102_{i=4}$ in an automated mode without intervention; the operator is usually required to disengage the automatic path following mode of the SGA, steer around the obstacle while recording the deviation, and then re-engage the automatic path following mode once the vehicle returns to the original path. The operator can also traverse the obstacle 216 without recording a swath path alteration. Using this approach, the next swath path would be generally parallel to the previous un-altered swath path and could direct the vehicle through the obstacle, requiring multiple manual passes around the obstacle until the original series of swath paths no longer intersect the obstacle. This approach could result in multiple passes over the same portion of the field which may or may not be problematic. Alternatively, the operator could record the altered path thereby allowing subsequent swath paths to include the redirected swath path around the obstacle 216 that would be carried through subsequently generated swath paths.

Figure 9:
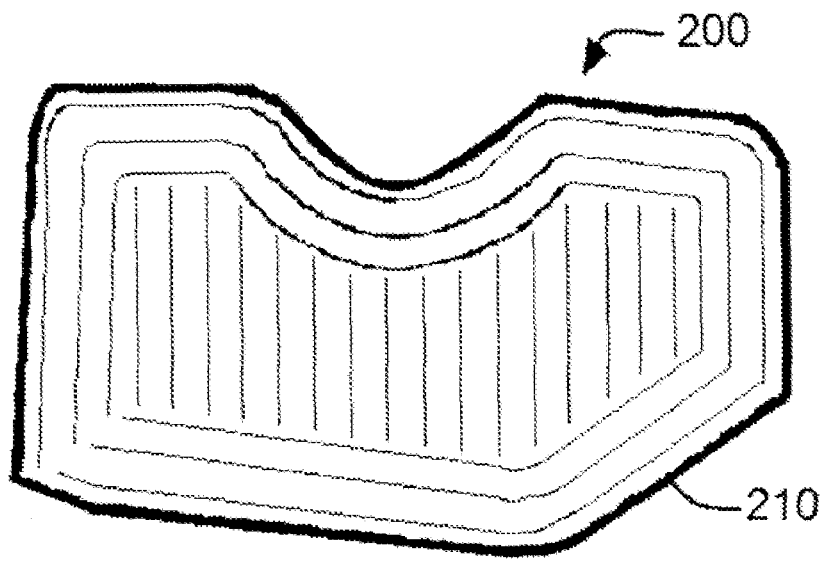
FIG. 9 illustrates the swath paths for a vehicle guidance system using a circumferential headlands with interior parallel swath path pattern to cover the land area.
Figure 10:
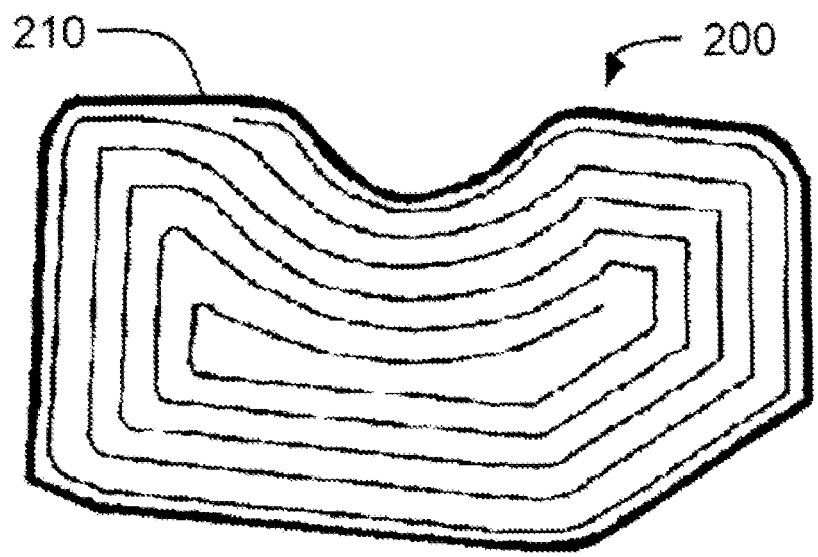
FIG. 10 illustrates the swath path for a vehicle guidance system using a spiral swath path pattern to cover the land area.

FIGS. 9 and 10 show two additional commonly used swath patterns for covering a field. FIG. 9 shows a headland pattern with parallel paths while FIG. 10 shows a spiral guidance pattern which is similar to the headland path except that each successive swath path is offset by a swath width. Each of these patterns use similar guidance methods as those described for straight-line and curved parallel path patterns.

During operation, the operator positions the vehicle near the beginning of a defined swath path, commonly displayed on screen 12 of the SGA 10. The system selects the closest swath path so that when the operator engages the automatic vehicle guidance system 5, the vehicle will begin along the swath path. Alternatively, the operator may override the system selection and choose another swath path to traverse using the keyboard 14 or touch screen 12 of the SGA 10.

Figure 11:
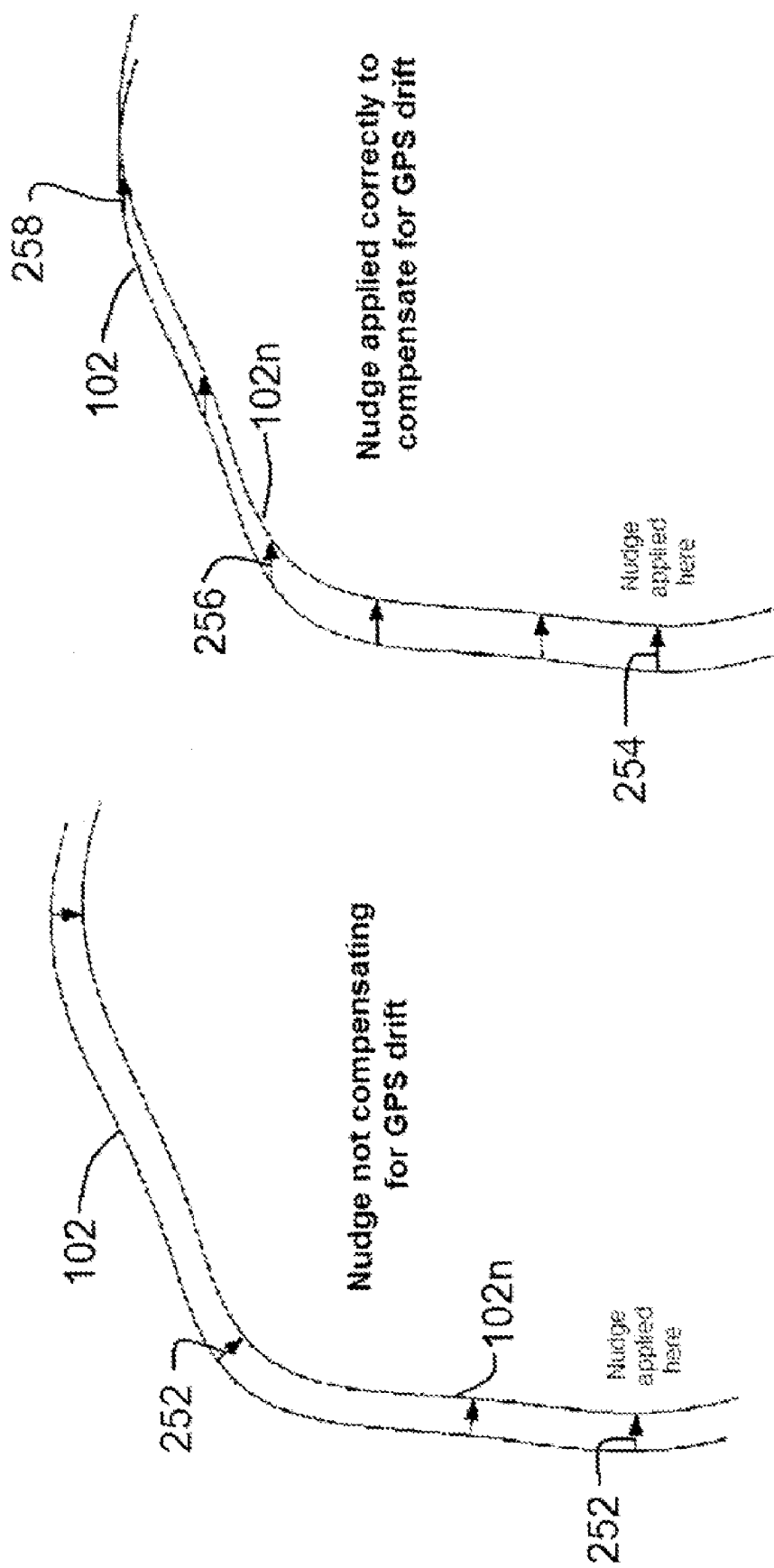
FIG. 11 illustrates the method for adjusting a swath path to account for drift in the vehicle positioning signal.

Referring finally to FIG. 11 as the vehicle traverses the swath paths 102, the operator may desire to slightly alter the swath paths to fine tune swath overlap or spacing. Variations in swath spacing are often caused by drift in the vehicle position (GPS) signals which result in adjacent swath paths being closer together or further apart than the effective implement width identified. To compensate, many vehicle guidance systems incorporate a "nudge" feature that allows the swath path 102 to be offset slightly to correct signal drift errors, shown as adjusted path $102_n$. One common approach to compensate for signal drift is to laterally shift the swath path being traversed to by an amount equal to the signal drift and carry the shift through to the end of the swath path. In effect, this approach performs a simple lateral shift of the baseline swath path. This method does not, however, account for circumstances in which the signal drift has different orthogonal components (e.g., drift in the E-W direction differs from drift in the N-S direction). Compensation for signal drift may be necessary in only one direction, E-W for example. Compensating for drift under such conditions may correct swath spacing in the E-W direction, but cause problems in spacing in the N-S direction.

In the present invention, the lateral shift feature is enhanced by using the vehicle heading when the lateral shift is applied to derive portional orthogonal components of the lateral shift in addition to the magnitude in each of the orthogonal directions. The actual vehicle oath correction, also referred to herein as a "nudge," is applied in a direction perpendicular to the vehicle heading at the time. The SGA, in applying the nudge to other position data points in the swath path, derives orthogonal portions of the nudge relative to the coordinate position system (x and y axis) used in by the SGA and adjusts each position data point by values in both the x-axis direction and the y-axis direction. These values may differ depending upon the degree of position signal drift. Thus, the system may adjust the swath path data point positions differently along one axis than along an orthogonal axis. This feature is shown as nudge 252 in FIG. 11 which is used to offset swath path 102n from 102 along the length of the path. The nudge function, implemented in software executed by the CPU 16 in the SGA 10, eschews the conventional nudge approach and instead determines orthogonal components (relative to the coordinate system used by the SGA 10) of the desired shift in the swath path and applies a portional adjustment, based on directional heading, to each position data point in the swath path. As the vehicle traverses the remainder of the swath path, the SGA applies the nudge adjustment relative to the direction of travel. In FIG. 11, nudge 254 is applied as a perpendicular adjustment to the swath path relative to the direction of travel. As the vehicle traverses the path and changes direction, the amount of adjustment needed to account for the signal drift varies based on the angle between the direction of travel when the nudge was applied and the direction of travel when subsequent position data points along the swath path are determined. These variations, shown as 256 and 258 in FIG. 11, illustrate the effect of making adjustments in both x and y (north-south and east-west) directions. An operator may then apply nudge in when traveling in multiple directions to identify a signal drift correction in two directions for more accurate signal drift compensation. With nudge corrections applied, a new baseline swath path is stored and may be used for subsequent swath path generation thereby improving precision of the overall swath pattern in the field.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based

Having thus described the invention, what is claimed is:

1. A method for selectively adjusting a swath path location relative to a vehicle and associated implement comprising the following steps:

providing a vehicle with an associated implement;

providing a vehicle guidance system having a vehicle position receiver;

providing a swath generation apparatus (SGA) having a processing capability and an SGA memory device, the SGA being communicatively coupled to the guidance system, providing an operator input device;

defining within the SGA a coordinate system for vehicle position;

communicating a baseline swath path to the SGA, the baseline swath path having at least three spaced apart position data points with swath path segments disposed between adjacent pairs of the at least three position data points;

determining a first vehicle heading at a position corresponding to a first point of the at least three position data points;

receiving by the SGA a swath path adjustment input from the operator input device, the swath path adjustment being applied in a direction perpendicular to the first vehicle heading;

determining orthogonal values of the adjustment input with respect to the coordinate system, the orthogonal values comprising an x-direction value and a y-direction value in the coordinate system;

storing the orthogonal values in the SGA memory;

determining a second vehicle heading with respect to the coordinate system at a position corresponding to a second point of the at least three position data points;

adjusting the second position data point by the stored orthogonal values based on a difference, relative to the coordinate system, between the first and second vehicle headings, the amount of adjustment applied at each position data point in the swath varies based on the heading of the vehicle when the swath path adjustment input was received and a heading of the vehicle when subsequent position data points are adjusted, wherein the adjustment of the data points is made in both north-south and or east-west directions with respect to a northern heading.

2. The method of claim 1, wherein:

the communicating a baseline swath path step comprises communicating a plurality of spaced apart position data points greater than three with a plurality swath path segments disposed between adjacent pairs of the position data points;

the determining a second vehicle heading step comprises determining by the SGA a heading for each of the plurality of swath path segments; and the modifying the second position data point position comprises modifying the position of each of the plurality of position data points comprising the baseline swath path by a portional amount of the orthogonal values based on a difference, relative to the orthogonal coordinate system, between the first vehicle heading and the heading of the swath path segment approaching each point thereby adjusting the position of the baseline swath path.

3. The method of claim 1, further comprising the steps:

receiving by the SGA first and a second swath path adjustment inputs from the operator input device, the first input being received as the vehicle travels along a first heading along the swath path, the second swath path adjustment being received as the vehicle travels along a second heading along the swath path;

determining by the SGA first and second orthogonal values of the first and second adjustment inputs;

determining by the SGA modified orthogonal values using the first adjustment input for the modified orthogonal value along one axis and the second adjustment input for the modified orthogonal value along a perpendicular axis; and modifying the position of each of the plurality of position data points comprising the baseline swath path by a portional amount of the modified orthogonal values relative to the orthogonal coordinate system thereby adjusting the position of the baseline swath path.

4. The method of claim 3, wherein the first heading differs from the second heading.

5. An apparatus for defining curved swath paths in a crop growing area of a field for a use with a vehicle guidance system for a vehicle and associated implement, the apparatus comprising:

a receiver configured to receive a vehicle position signal, said receiver providing a location output signal representing the location of said vehicle;

a vehicle directional controller communicatively coupled to said receiver and a vehicle steering apparatus; and a swath generation apparatus (SGA) having a digital electronic processor, an SGA memory, an operator input device, a visual display, and software for directing actions to be performed by the digital electronic processor. SGA memory, operator input device, and visual display in the SGA, said SGA being communicatively coupled to said receiver and said vehicle directional controller whereby the SGA is programmed to of laterally shift the at least one curved swath path in reply to a user-selected nudge, said at least one curved swath path having a plurality of spaced-apart position data points referenced in a coordinate system and sequentially arranged along a direction of travel, each said data point having a corresponding direction heading, said nudge being defined initially by an offset distance oriented perpendicularly to the direction heading at a first position data point on said swath path in terms of orthogonal values of said coordinate system, said orthogonal values comprising an x-direction vector and a y-direction vector, and applied to each subsequent position data point along the at least one curved swath path to laterally shift each subsequent data point with respect to the difference, relative to the coordinate system, between the first and each subsequent direction heading thereby shifting position of said swath path, the orthogonal values adjusting the position data points such that the amount of adjustment applied at each point varies based on the heading of the vehicle when the nudge was first applied and a heading of the vehicle when subsequent data points are adjusted.

6. The apparatus of claim 5, wherein said orthogonal values are derived from an adjustment at one position data point along said swath path.

7. The apparatus of claim 5, wherein said orthogonal values are derived from adjustments in said swath path occurring at least two position data points along said swath path.

8. The apparatus of claim 6, wherein said at least two position data points along said swath path each have a different direction heading relative to the coordinate system.

* * * * *